W. Dutemple,
Pipe Coupling,

Nº 48,797. Patented July 18, 1865.

Witnesses:
Francis Gould
S. B. Kidder

Inventor:
William Dutemple
by his Atty
J. B. Crosby

UNITED STATES PATENT OFFICE.

WILLIAM DUTEMPLE, OF MALDEN, MASSACHUSETTS.

IMPROVEMENT IN PIPE-COUPLINGS.

Specification forming part of Letters Patent No. 48,797, dated July 18, 1865.

*To all whom it may concern:*

Be it known that I, WILLIAM DUTEMPLE, of Malden, in the county of Middlesex and State of Massachusetts, have invented an Improved Coupling for Bitumenized Pipe; and I do hereby declare that the following, taken in connection with the drawings which accompany and form part of this specification, is a description of my invention sufficient to enable those skilled in the art to practice it.

This invention relates to the construction of metallic couplings or joints for bitumenized pipe.

It consists in chamfering the surface of the coupling against which the end of the pipe abuts, so as to leave a space into which the coating applied to the interior surface of the pipe in a liquid state may run to pack or cement the end of the pipe to the coupling; also, in the peculiar construction of the end of the coupling or joint, which bears a nut or female screw-thread for reception of the screw cut upon the other joint-piece or coupling.

Figure 1:
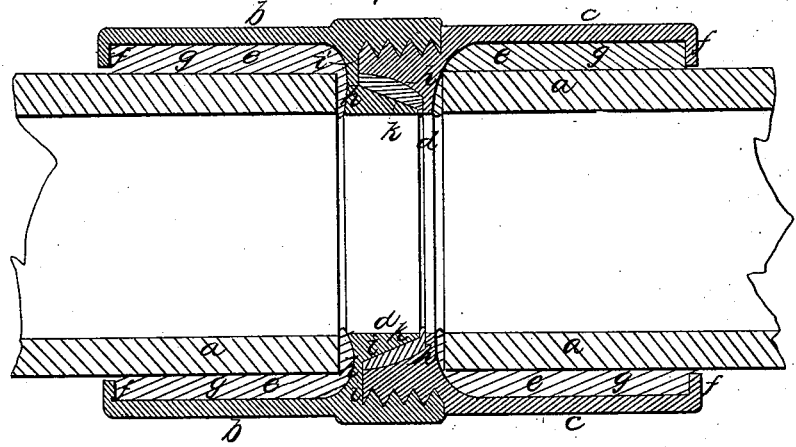
Figure 2:
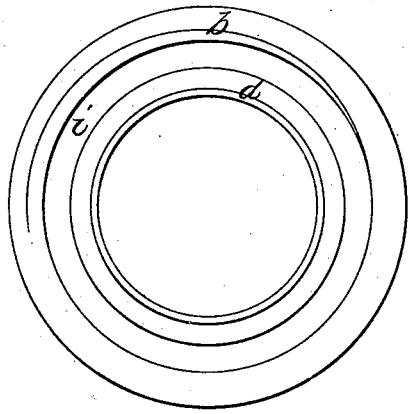
Figure 3:
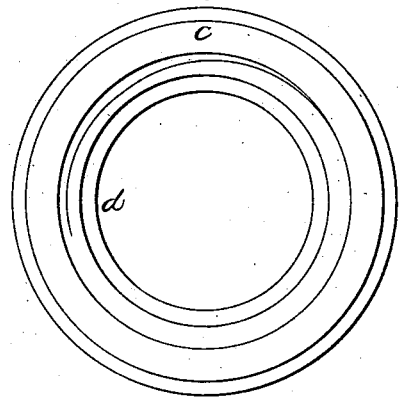

Figure 1 of the drawings represents a central section of the two parts of the coupling; Figs. 2 and 3, end views of the respective parts.

$a\ a$ denote the pipes to be coupled; $b\ c$, the metallic coupling. Each piece $b\ c$ is made with a contraction, $d$, at its outer end of about the diameter of the bore of the pipe $a$, and from this contraction to the opposite end the piece may be cast with an enlargement or space, $e$, of greater diameter than the pipe $a$, said opposite end having a circular lip or shoulder, $f$, corresponding in diameter to, or nearly to, the exterior diameter of the pipe $a$. When the joint or coupling-piece is to be applied to the pipe the space $e$ is filled with hydraulic or other suitable cement, $g$, when, the end of the pipe being inserted, the cement will adhere to the surface of the casting and to the surface of the pipe, securing them firmly together. The end of each pipe abuts against the lip or flange $h$, and the surface against which it so abuts is inclined, as seen in Fig. 1. This leaves a space between the end of the pipe and the casting, and when, after applying the casting to the pipe, a liquid coating is applied to the inner surface (which is done by pouring it into the upper end of the pipe, held in an inclined position, and rotated when so held) said liquid runs down into and fills this space, and, hardening there, makes a tight packing between the end of the pipe and the casting.

The piece $b$ is cast with a cup or recess, $i$, extending around it, the projection or ring $k$ forming the inner side of this recess being inclined, as seen in Fig. 1. The end of the piece $c$ extends into this recess in screwing the parts $b$ and $c$ together, and before they are so coupled this recess is filled with hydraulic or other suitable cement. When the parts are then screwed together this cement is pressed up by the inclined side of the projection or ring $k$, and is compressed between the same and the adjacent surface of the other part, $c$, making a strong and impervious packing between the two parts, as will be readily understood.

It will be obvious that pipes to run at angles with each other may be coupled by a connection made as described, the casting being formed with an elbow or curve to correspond to the angle at which the pipes are to be laid.

It will also be understood that a coupling may be made in one piece, having a space, $e$, in the same at both ends, such being used for the permanent connection of pipes which do not need to be taken apart.

Although intended principally for coupling bitumenized or similar pipe, it will be obvious that metallic pipes may be connected by a coupling having a construction as described.

I claim—

1. Giving to the lip or flange $h$ an inclination, in manner and for the purpose substantially as set forth.

2. The recess $i$ and lip or ring $k$, for reception of the male end of the coupling and the cement by which the parts are packed.

In witness whereof I have hereunto set my hand this 27th day of May, A. D. 1865.

WILLIAM DUTEMPLE.

Witnesses:
J. B. CROSBY,
F. GOULD.